Feb. 21, 1939. T. L. FAWICK 2,147,694
CONTROL FOR TRANSMISSIONS
Filed Sept. 13, 1937
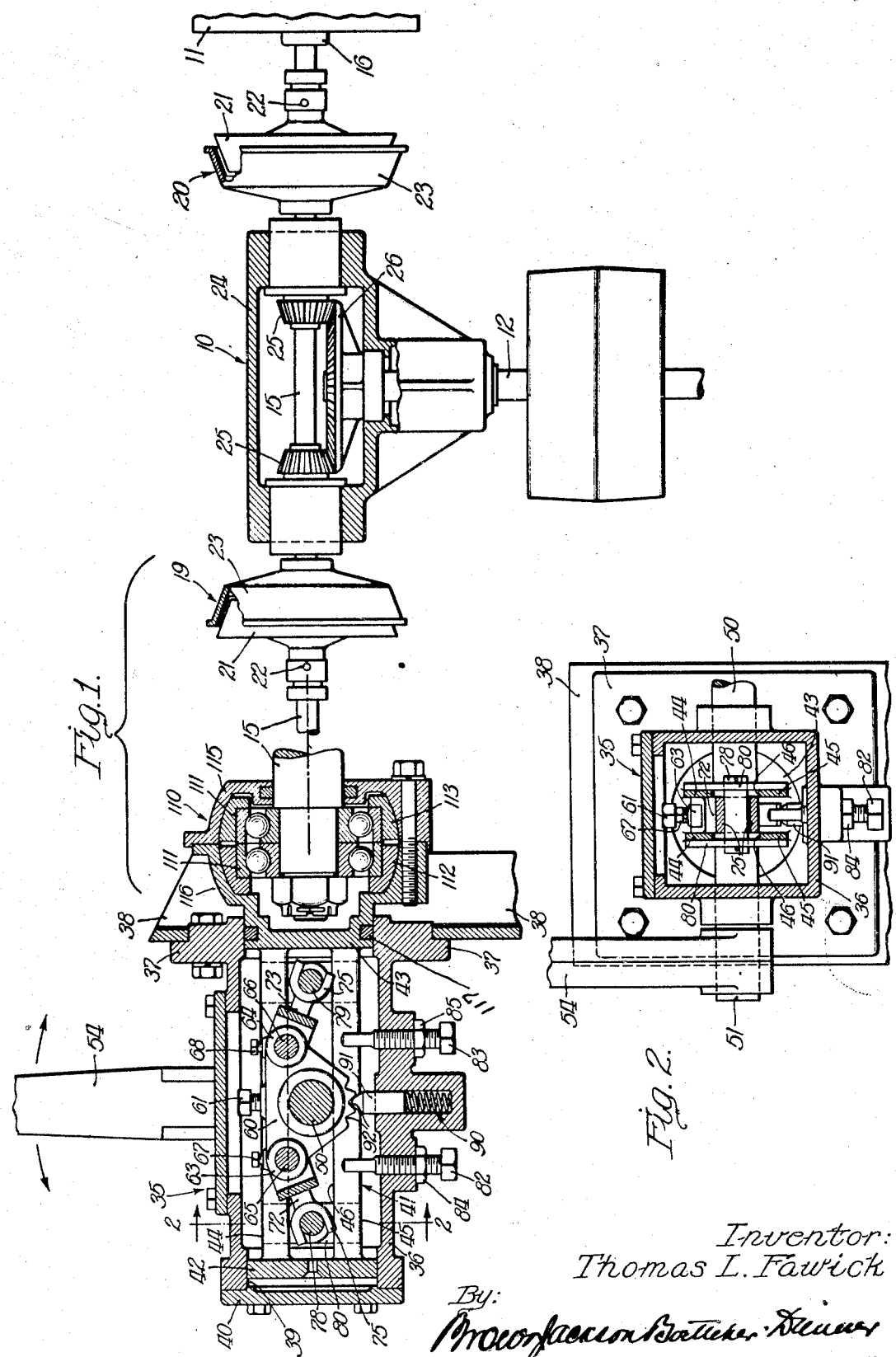
Inventor:
Thomas L. Fawick Patented Feb. 21, 1939

2,147,694

UNITED STATES PATENT OFFICE 2,147,694

CONTROL FOR TRANSMISSIONS

Thomas L. Fawick, Akron, Ohio, assignor to Industrial Clutch Company, Waukesha, Wis., a corporation of Wisconsin Application September 13, 1937, Serial No. 163,603

11 Claims. (Cl. 74—473)

The present invention relates generally to power transmission devices and is particularly concerned with a new and improved control mechanism therefor.

The principal object of the present invention is the provision of a simple and sturdy control unit for governing the shiftable part of a power transmission, being particularly adapted to control a shiftable part that is movable in either direction from a neutral position to an operating position. A further object of the present invention is the provision of a new and improved control unit for reversing mechanism and the like, especially adapted to position an axially shiftable power shaft for governing the transmission of power to a driven part in one direction or the other.

These and other objects and advantages of the present invention will be apparent to those skilled in the art after a consideration of the following detailed description of the preferred embodiment, taken in conjunction with the accompanying drawing illustrating such embodiment.

Figure 1 is a generally vertical section taken through a control unit and reversing transmission embodying the principles of the present invention, the section through the control unit being at a larger scale than the section through the reversing transmission; and Figure 2 is a section taken along the line 2—2 of Figure 1.

Referring now to the drawing, the reference numeral 10 indicates a power transmission unit for transmitting power from a source of power, such as a motor 11, to a driven member in the form of a shaft 12 or the like adapted to be rotated in one direction or the other. The transmission 10 is a reversing transmission and embodies a power shaft 15 slidably connected, as at 16, with the motor 11 so as to be capable of limited axial movement, and a pair of cone clutches 19 and 20, each including a driving clutch part 21, fixedly secured as at 22 in any suitable manner to the axially shiftable power shaft 15, and a driven clutch part 23 journaled for rotation in a suitable casing or frame 24. Each of the driven clutch parts 23 is securely fastened to or formed integral with a driving pinion 25. The pinions 25 are arranged for rotation about an axis that coincides with the axis of rotation of the power shaft 15 and the latter is slidably mounted within the sleeves on which the pinions 25 are carried. Both of the pinions are in mesh with a driven bevel gear 26 which is secured to and serves to drive the driven shaft 12. The bevel pinions 25 are disposed on opposite sides of the bevel gear 26 so that when one of the clutches is engaged, the gear 26 and the shaft 12 are driven in one direction, and when the other clutch is engaged the bevel gear 26 and the shaft 12 are driven in the other direction. Since the driving clutch parts 21 are rigidly secured to the axially movable power shaft 15, shifting the latter in one direction or the other serves to engage one of the clutches and disengage the other.

The present invention is particularly concerned with the provision of a control unit for shifting the movable transmission shaft 15 from one position to another, but the present invention is not limited to any particular type of power transmission, such as the one illustrated in the drawing, but may be applied to other forms of transmissions controlled, wholly or in part, by a member that is moved from one position to another. However, the present invention is especially applicable to transmissions having a member movable in either direction from a neutral position to an operating position. For example, the principles of the present invention could be arranged to control a marine reverse gear of the type disclosed and claimed in my copending application, Serial No. 11,505, filed March 16, 1935.

The control unit, which is indicated in its entirety by the reference numeral 35, for the transmission 10 includes a casing 36, which may be a part of the casing or the frame supporting the pinions 25 and associated parts mentioned above or a part separate therefrom. One end of the casing 36 is flanged, as at 37, so as to be attached to a stationary support 38, and the other end of the casing has an opening 39 which is closed by a plate 40. Slidably supported on the inside of the casing 36 is a member 41 in the form of a toggle casting which comprises heads or ends 42 and 43 connected by side wall portions 44 and 45 that are spaced apart laterally, as best shown in Figure 2, and each of which is provided with a central longitudinally disposed opening or cutout portion 46.

A shaft 50 is journaled for rocking movement in the casing 36 and one end of the shaft 50 extends exteriorly of the casing, as at 51, and receives an operating lever 54 by which the shaft 50 may be rocked in one direction or the other. The shaft 50 extends through the openings 46 in the casting 41, which are long enough to permit the toggle casting member 41 to be moved in one direction or the other.

A plate 60 is fastened to the shaft 50 in a position between the planes of the side wall portions 44, 45 by a set screw 61 or other suitable means, and the lever 54, together with the shaft 50 and plate member 60, constitutes a double-ended lever by which the toggle casting 41 may be shifted in one direction or another from a neutral position. The member 60 includes generally oppositely extending arm portions 63 and 64 which are formed with suitable bosses and are apertured to receive pivot pins 65 and 66 which are held in place by set screws 67 and 68, respectively. The pivot pins 65 and 66 receive the inner end of oppositely extending connections in the form of links 72 and 73, the inner ends of which are bifurcated so as to be disposed on opposite sides of the rocking member 60 and are apertured to receive the pivot pins 65 and 66. The outer ends of the links 72 and 73 are formed, as at 75, so as to embrace pins 78 and 79 that are carried by brackets or lugs 80 suitably mounted on or formed integral with in the side wall portions 44, 45 of the toggle casting 41.

The links 72 and 73, together with the rocking member 60, constitute toggles between the operating lever 54 and the slidably mounted part 41. Stops 82 and 83, which may be in the form of screws threaded into the casing and held in adjusted position by lock nuts 84 and 85, are disposed in the plane of the member 60 and serve to limit the movement thereof in either direction and are adapted to be adjusted so that when the lever 54 is swung in one direction or the other, from the neutral position, which is the position illustrated in the drawing, the axis of the pivot pin, 65 or 66, lies just below the line connecting the slidable pin, 78 or 79, and the pivot shaft 50. By virtue of this construction, either toggle connection can be relied upon for holding or locking the slidable part 41 in either of its operative positions, and this, in turn, holds the shiftable transmission shaft 15 in position for engaging one of the clutches for driving the shaft 12 in one direction and disengaging the other clutch. If desired, however, detent mechanism 90 may also be provided, such mechanism comprising a spring pressed or plunger ball 91 and a plurality of notches 92 formed in the lower portion of the rocking member 60. Such detent mechanism is especially useful in holding the lever 54 in its neutral position, and it is also useful in holding the control unit in either of its operative positions.

When the control unit described above is arranged to control an axially shiftable power shaft, such as the shaft 15 shown in Figure 1, a thrust bearing 110, preferably but not necessarily of the double-row ball type, is mounted at one end of the shaft 15, and the outer races 111 of the bearing 110 are carried in spherical bushing sectors 112 and 113 upon which the two detachable halves 115 and 116 of a spherical socket are mounted. The member 116 is preferably made as a part of one end of the slidable member 41, although if desired the socket 116 may be made separately and fastened to the toggle casting 41 in any suitable manner. The head 43 or the socket 116 is provided with sealing means 117. This form of connection between the member 41, which does not rotate, and the axially shiftable shaft 15, which does rotate, accommodates not only the rotation of the latter but also any axial misalignment between the shaft 15 and the slidable member 41.

In operation, referring now to Figure 1 in which the parts are arranged in their neutral position, swinging the control lever or handle 54 in one direction, say to the left as viewed in Figure 1, causes the rocking member 60 to exert a thrust through the toggle link 72 against the pin 78 carried in the casting 41. The latter is thus forced to move to the left as viewed in this figure relative to the casing 36 and to the transverse shaft 50 rockably mounted in the latter, the slotted or cut-out portion 46 accommodating this movement of the member 41 relative to the transverse shaft 50. Movement of the member 41 toward the left exerts a pull through the thrust bearing 110 against the end of the power shaft 15, and this causes the clutch 20 to be engaged. When the lever 54 has been swung toward the left into its maximum position, the arm section 63 of the member 60 engages the stop 82, and since the axis of the pivot pin 65 now lies just below the line connecting the shaft 50 and the pin 78, the member 40 is locked in position. This position represents one operating position in which the clutch 20 is fully engaged and the power transmitted from the source 11 through the clutch 20 to the right hand pinion 25, thus rotating the driven gear 26 and shaft 12 in one direction. In this position the driven clutch part 23 of the other clutch 19 rotates idly in a direction opposite to the direction of rotation of the driving clutch member 21 for this clutch, but since the clutch is entirely disengaged, such relative movement is accommodated. During the swinging movement of the lever 54 toward the left as viewed in Figure 1, which causes the slidable member 40 to be shifted to the left as just described, due to the angular relations between the pivot axes 65 and 66 and the axis of the shaft 50, the pivot pin 66 is drawn away from the slidable pin 79 at a somewhat greater rate than the left hand movement of the member 40 as a whole. However, this retreating movement of the link 73 is accommodated by virtue of the sliding of the fork 75 with respect to the pin 79. Thus, such a construction is in the nature of a one-way connection or a lost motion connection, as is obvious.

When the control lever 54 is swung away from its left-hand operative position back to a neutral position, and then to the right, as viewed in Figure 1, any slack between the right-hand connecting link 73 and the pin 79 is first taken up, and then as soon as contact is established between these parts the slidable member 41 is shifted to the right, first reaching its neutral position and effecting the disengagement of the right hand clutch 20. Continued swinging of the lever 54 in the right hand direction then causes the slidable member 41 to be shifted to the right, which exerts a thrust against the left hand end of the power shaft 50 and causes the latter to be moved on the splined or slip connection 16. This brings the driving member 21 of the clutch 19 into engagement with the driven member 23. Since these parts were rotating in opposite directions, the initial engagement of the clutch parts brings the left-hand pinion 25, and the load connected therewith, to a standstill, and then as the lever 64 is swung further and the shaft 15 moved farther toward the right, the clutch parts 21 and 23 of the left-hand clutch 19 are pressed into firm engagement, thereby picking up the load and rotating the bevel gear 26 and the shaft 12 in a direction opposite to that in which it was rotated when the right-hand clutch 20 was engaged. When the lever 54 reaches its full right-hand position, the arm 64 of the member 60 is brought into contact with the stop 83, whereby the member 41 is locked in its other operating position by the toggle action of the arm 64 and the link 73. The notches 92 are so arranged that the spring pressed plunger 91 is fully engaged in one of them when the lever 64 is in its neutral or either of its operating positions.

While I have described above the preferred construction in which the principles of the present invention have been embodied, it is to be understood that my invention is not to be limited to the specific details shown and described, but that, in fact, widely different means may be employed in the practice of the broader aspects of my invention.

What I claim, therefore, and desire to secure by Letters Patent is:

1. Control means for transmissions comprising a part shiftable in opposite directions from a neutral position, a pivoted control lever, and oppositely extending connections disposed between said lever and said part so that the latter is shifted in one direction when the lever is swung in one direction and in the opposite direction when the lever is swung in the other direction.

2. Control means for transmissions comprising a part shiftable in opposite directions from a neutral position, a pivoted control lever, and opposite extending toggle means disposed between said lever and said part and each having a lost motion connection with said part so that when the control lever is swung in either direction one of said toggle means exerts a force on said part to shift the same.

3. Control means for transmissions comprising a part shiftable in opposite directions from a neutral position, a control lever pivoted for swinging movement adjacent said part and having means serving as oppositely disposed arms, and a toggle connection extending in opposite directions from said arms and connected with said part so that the latter is shifted when said lever is swung about its pivot.

4. Control means for transmissions having a member shiftable in opposite directions from a neutral position, said means comprising a control lever, a slidably mounted toggle casting and operatively connected with said member, and oppositely extending toggle connections between said control lever and said toggle casting and arranged to shift the latter to and to hold the same in either of its operative positions.

5. Control means for transmissions having a member shiftable in opposite directions from a neutral position, said means comprising a casing, a part slidably mounted therein and operatively connected with said member, a control lever, oppositely extending toggle connections between said control lever and said slidable part and arranged to shift the latter to and to hold the same in either of its operative positions, and stop means cooperating with said control lever to establish an over-center locked position for each of said toggle connections.

6. Control means for transmissions having a member shiftable in opposite directions from a neutral position, said means comprising a casing, a part slidably mounted therein, a coupling between said member and said part, a shaft journaled in said casing, said part having openings accommodating said shaft, a double ended member fixed to said shaft, oppositely extending connections between said double ended member and said part, and means for rocking said shaft.

7. Control means for transmissions comprising a part shiftable in opposite directions from a neutral position, a pivoted control lever, and members pivotally connected with said lever at the same side of the pivot axis thereof and extending in generally opposite directions therefrom, said members being pivotally connected with said part so that the latter is shifted in one direction when the lever is swung in one direction and in the opposite direction when the lever is swung in the other direction, one of the pivotal connections of each of said members being in the nature of a lost motion connection.

8. Control means for transmissions having a member shiftable in opposite directions from a neutral position, said means comprising a casing, a part slidably mounted therein and having spaced side wall portions with openings in the latter, a transversely disposed shaft journaled in said casing and extending through said openings, an operating member having generally oppositely disposed arms lying between said spaced side portions, generally oppositely extending connections between the outer ends of said arms, respectively, and said slidable part, so that the latter will be shifted in one direction when said operating member is swung in one direction and in the opposite direction when the operating member is swung in the other direction, and an operating lever secured to said transverse shaft exteriorly of said casing.

9. Control means for transmissions having a rotatable shaft shiftable in opposite directions, said control means comprising a generally stationary casing, a part shiftably mounted in the latter and having a rotatable connection with one end of said shaft for shifting the latter axially, a transverse shaft journaled for rocking movement in said casing, means serving as a pair of generally oppositely disposed arms fixed to said shaft, oppositely disposed connections extending between said arms and said slidable part, and means for rocking said shaft in one direction or the other for shifting said transmission shaft in one direction or the other.

10. Control means for transmissions having a member shiftable in opposite directions from a neutral position, said means comprising a casing, a part slidably mounted therein, a member mounted for rocking movement in said casing about a transverse axis, and oppositely disposed links pivoted to said member and connected, respectively, with said slidable parts with a one-way connection, whereby said slidable part can be moved in one direction or the other by a rocking movement of said member in one direction or the other.

11. Control means for transmissions having a member shiftable in opposite directions from a neutral position, said means comprising a casing, a part slidably mounted therein and carrying spaced pins, a rocking member disposed between said pins, and generally oppositely disposed links pivoted to said rocking member, each of said links having a fork at its outer end embracing the associated pin and adapted to act therethrough to shift said slidable part in one direction.

THOMAS L. FAWICK.